US012743489B2

(12) United States Patent
Choi et al.

(10) Patent No.: US 12,743,489 B2
(45) Date of Patent: Sep. 22, 2026

(54) METHOD AND DEVICE FOR DISABLING UNAUTHORIZED COPYING OF CONTENT

(71) Applicant: RIROSOFT CORP., Seoul (KR)

(72) Inventors: Seok Choi, Seoul (KR); Ho Kyu Kim, Gwangmyeong-si (KR)

(73) Assignee: RIROSOFT CORP., Seoul (KR)

( * ) Notice: Subject to any disclaimer, the term of this patent is extended or adjusted under 35 U.S.C. 154(b) by 0 days.

(21) Appl. No.: 19/129,232

(22) PCT Filed: Aug. 8, 2023

(86) PCT No.: PCT/KR2023/011632
§ 371 (c)(1),
(2) Date: May 12, 2025

(87) PCT Pub. No.: WO2024/101597
PCT Pub. Date: May 16, 2024

(65) Prior Publication Data
US 2026/0010589 A1 Jan. 8, 2026

(30) Foreign Application Priority Data
Nov. 11, 2022 (KR) ........................ 10-2022-0150204

(51) Int. Cl.
*G06F 21/10* (2013.01)

(52) U.S. Cl.
CPC .................................. *G06F 21/106* (2023.08)

(58) Field of Classification Search
CPC .......... G06F 21/106; G06F 8/30; G06F 21/10; G06F 40/205; G06F 40/279
See application file for complete search history.

(56) References Cited

U.S. PATENT DOCUMENTS 7,130,831 B2 * 10/2006 Howard .............. G06F 21/6209 726/17
8,087,091 B2 * 12/2011 Risan ...................... G06F 21/10 726/31
8,615,810 B2 * 12/2013 Kim ...................... G06F 16/958 726/33
9,258,136 B2 * 2/2016 Verschoor ........... H04L 12/2818
12,026,249 B2 * 7/2024 Yucra Rodriguez ......................... G06F 21/566
2012/0057707 A1 * 3/2012 Fang ..................... H04L 9/0897 380/277

FOREIGN PATENT DOCUMENTS

JP 2002-091969 A 3/2002
KR 10-2009-0122606 A 12/2009
(Continued)

*Primary Examiner* — Pramila Parthasarathy
(74) *Attorney, Agent, or Firm* — Bridgeway IP Law Group, PLLC; Sang Ho Lee; Hyun Woo Shin

(57) ABSTRACT

Provided are a method and a device for disabling unauthorized copying of content. The device includes a memory that stores divided word segments for each text of the content, and one or more processors that are connected to the memory, and divide received text into word segments and store the word segments in the memory, append a specific character to each divided word segment, generate a code for outputting the specific character to have a character size of '0' on a user terminal, and transmit a program written in a program language including the code to the user terminal.

3 Claims, 3 Drawing Sheets

(56) References Cited

FOREIGN PATENT DOCUMENTS

| | | | |
|---|---|---|---|
| KR | 10-1559380 | B1 | 10/2015 |
| KR | 10-1572242 | B1 | 11/2015 |
| KR | 10-2042722 | B1 | 11/2019 |
| KR | 10-2114073 | A | 5/2020 |
| KR | 10-2355235 | B1 | 2/2022 |

* cited by examiner

100
User terminal
120
Processor
130
Memory
110
Bus
150
160
170
Input/output interface
Display
Communication interface
Application
147
Application programming interface (API)
145
140
Middleware
143
Kernel
141

2022 1st semester 1st grade final exam

Population : Total (340 people) Class : Total (340 people) Student : Total (340 people)

| Rank | Department rank | Class rank | Student number | Name | Korean[4] | English[4] | Math[4] | Korean History[3] | Social Studies[3] | Science[3] |
|---|---|---|---|---|---|---|---|---|---|---|
| 1 | 1 | 1 | 10101 | Student1 | 96.6 | 94.6 | 71.5 | 97 | 96 | 86.7 |
| 2 | 2 | 2 | 10103 | Student2 | 70.5 | 51.6 | 56.5 | 57.4 | 50.2 | 21.8 |
| 3 | 3 | 3 | 10104 | Student3 | 38.8 | 29.2 | 72.3 | 87.5 | 63.3 | 15.4 |
| 4 | 4 | 4 | 10105 | Student4 | 14.3 | 25.6 | 18.6 | 22.6 | 22.5 | 29.3 |
| 5 | 5 | 5 | 10108 | Student5 | 34.5 | 65.9 | 50.9 | 76.5 | 49 | 44.1 |

FIG. 4

| Rank | Department | Class | Student number | Name | Korean[4] | English[4] | Math[4] | Korean History[3] | Social Studies[3] | Science[3] |
|---|---|---|---|---|---|---|---|---|---|---|
| 1 | 1 | 1 | 10101 | Student1 | 96.36 | 947.6 | 1171.5 | 1497 | 9615 | 8619.7 |
| 2 | 2 | 2 | 10103 | Student2 | 70.215 | 251.6 | 556.5 | 57.64 | 50.92 | 1421.8 |
| 3 | 3 | 3 | 10104 | Student3 | 38.158 | 29.182 | 2372.3 | 87.05 | 63.33 | 815.4 |
| 4 | 4 | 4 | 10105 | Student4 | 1114.3 | 25.126 | 1718.6 | 2022.6 | 2322.5 | 291.3 |
| 5 | 5 | 5 | 10108 | Student5 | 344.5 | 657.9 | 5010.9 | 1476.5 | 4915 | 44.181 |

FIG. 5

METHOD AND DEVICE FOR DISABLING UNAUTHORIZED COPYING OF CONTENT

TECHNICAL FIELD

The present disclosure relates to a copying preventing system, and more particularly, to a method and a device for disabling unauthorized copying of content.

BACKGROUND ART

Making a complete copy of information in an electronic format is easier than making a complete copy of information in a physical format. This fact makes content owners cautious about creating their electronic information that is easily accessible to the public. However, the content owners often want to provide their content to users at a cost, and may benefit from making such information searchable to help the users when searching for content related to their interests and needs. In particular, users of search engines expect to see documents or other content-related parts before purchasing the content.

However, allowing the users to access the relevant parts generally results in the users accessing the entire document, and the users are able to make a complete copy of the content without payment therefor.

Accordingly, there is a need for a method of preventing the users from making a copy of text-oriented content.

RELATED ART DOCUMENTS

Patent Documents (Patent Document 1) Korean Patent Application Publication No. 10-2009-0122606

(Patent Document 2) Korean Patent No. 10-2114073

DISCLOSURE

Technical Problem

The present disclosure has been devised to solve the above problem, and has a purpose of providing a method and a device for disabling unauthorized copying of content in a text form by a simple method.

Further, another purpose of the present disclosure is to provide a method and a device for disabling unauthorized copying of content that may disable the unauthorized copying of the content without causing inconvenience to a user in inquiring information.

Purposes of the present disclosure are not limited to the above-mentioned matters.

Technical Solution

According to a first embodiment of the present disclosure for the above purposes, a device for disabling unauthorized copying of content includes a memory that stores divided word segments for each text of the content, and one or more processors that are connected to the memory, and divide received text into word segments and store the word segments in the memory, append a specific character to each divided word segment, generate a code for outputting the specific character to have a character size of '0' on a user terminal, and transmit a program written in a program language including the code to the user terminal.

The specific character may include at least one of a prefix, a suffix, and a random word.

The content may be an electronic document in a format selected from at least one of Excel, Word, PowerPoint, portable document format (PDF), and Hangul.

The content may be a web document, and the one or more processors may generate the code for outputting the specific character to have the character size of '0' on a browser of the user terminal, and transmit, to a web server, the program written in the program language including the code and to be executed on the user terminal, and the web server may transmit the program written in the program language displayed on the browser to the user terminal.

The content may constitute data visible to a naked eye in a web document on the user terminal.

The one or more processors may analyze a text type of each divided word segment, and append the specific character to each divided word segment based on the text type.

According to a second embodiment of the present disclosure, a method for disabling unauthorized copying of content includes dividing, by one or more processors, received text of the content into word segments and storing the word segments, appending, by the one or more processors, a specific character to each divided word segment, generating, by the one or more processors, a code for outputting the specific character to have a character size of '0' on a user terminal, and transmitting, by the one or more processors, a program written in a program language including the code to the user terminal.

According to a third embodiment of the present disclosure, in a storage medium storing instructions, the instructions, when executed by one or more processors, cause the one or more processors to perform at least one operation, and the at least one operation includes an operation of dividing received text of content into word segments and storing the word segments, an operation of appending, by a content unauthorized copying disabling device, a specific character to each divided word segment, an operation of generating, by the content unauthorized copying disabling device, a code for outputting the specific character to have a character size of '0' on a user terminal, and an operation of transmitting, by the content unauthorized copying disabling device, a program written in a program language including the code to the user terminal.

Advantageous Effects

As described above, according to the present document, provided are the method and the device for disabling the unauthorized copying of the content that store the input text in the manner of being divided into the word segments, append the specific character to the divided word segment, generate the code for outputting the specific character to have the character size of '0' on the user terminal, and then transmit the program language including the code to the user terminal. With the simple method, the unauthorized copying of the content may be disabled without causing the inconvenience to the user in inquiring the information.

DESCRIPTION OF DRAWINGS

FIGS. 4 and 5 are diagrams illustrating an application example of a content unauthorized copying disabling method according to the present disclosure.

BEST MODE

Figures 1, 2:
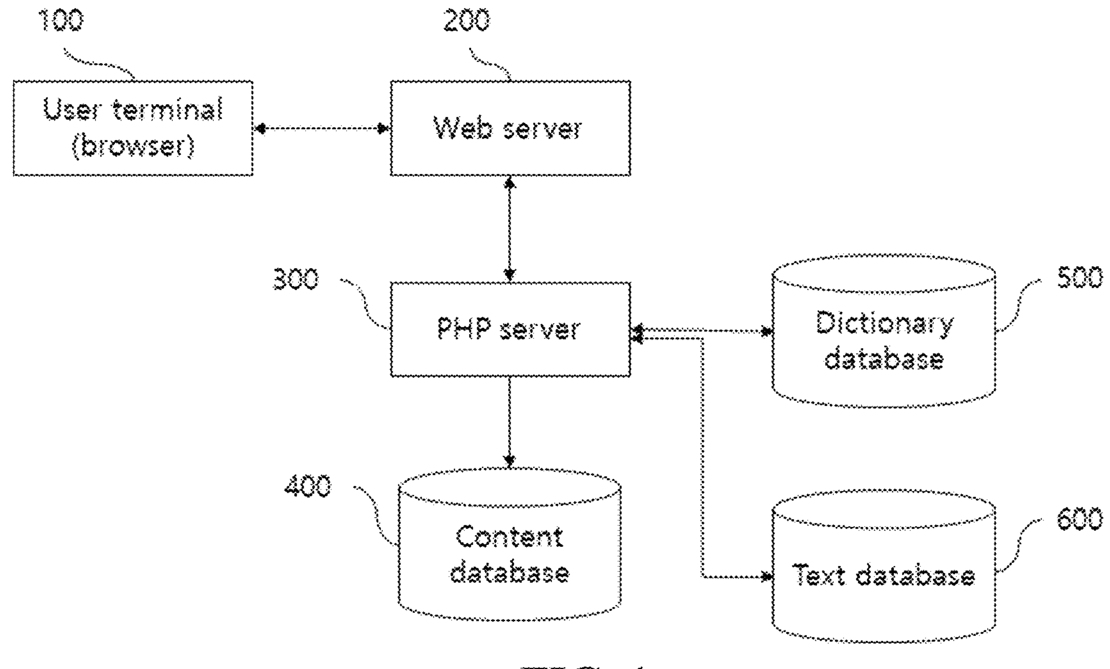
FIG. 1 is a block diagram illustrating a schematic configuration of a content unauthorized copying disabling system according to an embodiment of the present disclosure.
FIG. 2 is a block diagram illustrating a schematic configuration inside a user terminal.

It should be noted that the technical terms used herein are used only to describe specific embodiments and are not intended to limit the present disclosure. In addition, the technical terms used herein should be interpreted as meanings generally understood by those skilled in the art to which the present disclosure pertains, and should not be interpreted as excessively comprehensive meanings or excessively reduced meanings, unless specifically defined as other meanings herein. In addition, when the technical terms used herein are incorrect technical terms that do not accurately express the spirit of the present disclosure, they should be understood by being replaced with technical terms that may be correctly understood by those skilled in the art. In addition, general terms used herein should be interpreted as defined in the dictionary or according to the context before and after, and should not be interpreted as excessively reduced meanings.

Further, as used herein, the singular forms "a," "an," and "the" are intended to include the plural forms as well, unless the context clearly indicates otherwise. In the present application, terms such as "composed of" or "include" should not be construed as necessarily including all of various components or steps described herein, but should be construed as allowing for the possibility that some components or steps may be omitted, or that additional components or steps may be included.

In addition, suffixes "module" and "unit" for components used herein are given or used interchangeably in consideration of the ease of writing the present document, and do not have meanings or roles distinguished from each other by themselves.

In addition, terms including ordinals, such as first, second, and the like, used herein may be used to describe various components, but the components should not be limited by the terms. The terms are used only for the purpose of distinguishing one component from another component. For example, without departing from the scope of the present disclosure, a first component may be referred to as a second component, and similarly, a second component may also be referred to as a first component.

In an embodiment of the present disclosure, content may include script-type content used and expressed in a web including HyperText Markup Language (HTML) and JavaScript; stream information including a HyperText Transfer Protocol (HTTP) header including Host, (Request-Line) GET/POST, Referer, and User-Agent; file content in formats such as Flash Player, Excel, Word, Power Point, PDF, and Hangul (HWP); and unsafe content including a script, a file, and an Internet URL address.

DESCRIPTION OF SYMBOLS

100: User terminal
200: Web server
300: PHP server
400: Content database
500: Dictionary database
600: Text database

DETAILED DESCRIPTION OF THE INVENTION

Hereinafter, preferred embodiments according to the present disclosure will be described in detail with reference to the accompanying drawings, and the same or similar components will be given the same reference numerals regardless of the drawing number, and redundant descriptions thereof will be omitted.

In addition, in describing the present disclosure, when it is determined that a detailed description of the related known technology may obscure the gist of the present disclosure, the detailed description thereof will be omitted. In addition, it should be noted that the accompanying drawings are only for easily understanding the spirit of the present disclosure, and the spirit of the present disclosure should not be interpreted as being limited by the accompanying drawings.

FIG. 1 is a block diagram illustrating a schematic configuration of a content unauthorized copying disabling system according to an embodiment of the present disclosure.

Referring to FIG. 1, the content unauthorized copying disabling system according to the present disclosure may include a user terminal 100, a web server 200, a PHP server 300, a content database 400, a dictionary database 500, and a text database 600.

The user terminal 100 may include all kinds of handheld wireless communication devices that may be connected to the web server 200 via a network, such as a mobile phone, a smart phone, a personal digital assistant (PDA), a portable multimedia player (PMP), a tablet PC, and the like, and may also include communication devices that may be connected to the web server 200 via the network, such as a desktop PC, a tablet PC, a laptop PC, and an IPTV including a set-top box.

The user terminal 100 may receive content, for example, a web page, from the web server 200 via an application installed in the user terminal 100, or may receive the content via a web browser. Here, the web browser may use functions such as AJAX, DHTML, ADOBE® FLASH®, JAVASCRIPT®, JAVA®, Application Programming Interface (API), and the like. The present disclosure is not limited in relation to outputting the web page, which will be described later.

The user terminal 100 may display the content provided from the web server 200 on a screen, and when a user selects the content displayed on the screen, may receive a web page corresponding to the content via the web browser. In this regard, the content may be selected via the user terminal 100 by a method such as a mouse click, a keyboard input, a finger touch, or the like.

The web server 200 provides the web page to the user terminal 100 in response to a web page request of the user terminal 100. Here, the web page may include a script that may be executed in the web browser of the user terminal 100. The web server 200 may be implemented as an embedded web server as well as a general web server. Especially, it may be implemented as an embedded web server embedded in a device constituting an Extensible Home Theater (XHT) network among the embedded web servers. Here, the XHT network is a network system using an XHT communication scheme, and the XHT communication scheme is a technology capable of controlling several digital TVs as well as video and audio devices connected to the digital TV using an IEEE 1394 cable capable of stably transmitting multiple high definition (HD)-class signals and an IP over 1394 protocol using an Internet Protocol (IP), which is a communication standard mainly used in the Internet.

The PHP server 300 receives text of the content to be executed in the browser of the user terminal 100 from the content database 400, stores the received text in a manner of being divided into word segments, appends a specific character (e.g., a prefix, a suffix, a random word, and the like) to the divided word segment, generates a code for outputting the specific character to have a character size of '0' on the browser of the user terminal 100, and transmits the content including the script to be executed in the browser of the user terminal 100, including the code, to the web server 200. Here, the PHP server 300 corresponds to an example of a content unauthorized copying disabling device. In an embodiment of the present disclosure, the PHP server 300 is described for convenience of description, but the present disclosure may not be limited thereto, and the server may be a server using functions such as ASP, ACTIVEX®, ANSI® C++/C#, MICROSOFT®, NET, CGI SCRIPTS, JAVA®, JAVASCRIPT®, PERL®, PHP, PYTHON®, WEBOBJECTS®, and the like.

In one example, when appending the specific character to the divided word segment, the PHP server 300 may analyze a text type of the divided word segment and append the specific character to the divided word segment based on the text type. Here, the analyzing, by the PHP server 300, of the text type indicates determining whether the text is a number or a letter, or which country's language it is, and the like.

The content database 400 stores the content in a form of a string, or a phrase or clause in which multiple strings are connected to each other in each field. In addition, the content database 400 includes fields such as 'serial number', 'TITLE', 'ARTIST', 'GENRE', 'ALBUM', 'COMPOSER', 'PATH', and 'NAME'. However, the fields may not be limited thereto, and fields corresponding to various information related to the content may be further included. In addition, the content database 400 may specifically store source data of the content to be finally output on the web browser of the user terminal 100. For example, in a case of a content database for a school student record, various actual related content such as names, class information, number information, grades, and the like of students may be stored. It goes without saying that arbitrary characters that are not visible to the naked eye are not inserted into each content on the present content database. The content database 400 stores pure content.

The dictionary database 500 stores various language information required for the PHP server 300 to analyze the text type. For example, the dictionary database 500 may be used to determine what kind of text or data the data received from the content database 400 is, such as Korean, English, Japanese, Chinese, and numbers.

The text database 600 stores appropriate prefixes, suffixes, and random words for each language. More specifically, when the data to be output on the user terminal 100 is stored in the content database 400 in a form of Korean text, when it is intended to output the data via software (e.g., the web browser, various viewers, or the like) for outputting the data on the user terminal 100, the present disclosure may refer to the prefixes such as 'nal-', 'dwi-', 'deul-', 'cham-', 'gang-', 'gun-', and 'han-' and the suffixes such as '-geori', '-gi', '-gi', '-nim', and '-bal'. Although Korean has been illustrated as described above, it goes without saying that the present disclosure may insert prefixes, suffixes, arbitrary random characters, or the like of English, Chinese, Japanese, and the like.

In one example, the content unauthorized copying disabling device according to the present disclosure may be implemented in a form of software, and the user terminal 100 may download an execution file and execute the corresponding software. To this end, as illustrated in FIG. 2, the user terminal 100 may include a bus 110, a processor 120, a memory 130, an input/output interface 150, a display 160, and a communication interface 170. In some embodiments, the user terminal 100 may omit at least one of the components or may additionally include other components. More specifically, software according to a content unauthorized copying disabling method may operate in a stand-alone form rather than in a server-client form of the web server-PHP server-content database/dictionary database/text database connection described above. That is, the software according to an embodiment to which the present disclosure is applied may include the above-mentioned PHP server operation logic, and may include both of the content database and the dictionary database required additionally. Accordingly, when the user inputs content that the user wants to disable content copying into the preset software, content to which the present disclosure is applied may be output via the software according to the present disclosure. In addition, the software according to the content unauthorized copying disabling method according to the present disclosure may be developed in various languages such as Cor C++ and distributed in the stand-alone type.

The bus 110 may include, for example, a circuit that connects the components 110 to 170 to each other and delivers communication (e.g., a control message and/or data) between the components.

The processor 120 may include one or more of a central processing unit (CPU), an application processor (AP), and a communication processor (CP). The processor 120 may execute, for example, operation or data processing related to control and/or communication of at least one other component of the user terminal 100. The processor 120 may be referred to as a controller, may include the controller as a part thereof, or may constitute the controller. The memory 130 may include a volatile and/or non-volatile memory. The memory 130 may store, for example, a command or data related to at least one other component of the user terminal 100.

According to an embodiment, the memory 130 may store software and/or a program 140. The program 140 may include, for example, a kernel 141, middleware 143, an application programming interface (API) 145, and/or an application program (or an "application") 147. At least a portion of the kernel 141, the middleware 143, and the API 145 may be referred to as an operating system (OS).

The kernel 141 may control or manage system resources (e.g., the bus 110, the processor 120, the memory 130, or the like) used to execute operations or functions implemented in other programs (e.g., the middleware 143, the API 145, or the application program 147). In addition, the kernel 141 may provide an interface through which the middleware 143, the API 145, or the application program 147 may access individual components of the user terminal 100 and control or manage the system resources.

The middleware 143, for example, may serve as an intermediary for allowing the API 145 or the application program 147 to be in communication with the kernel 141 and exchange data therewith.

In addition, the middleware 143 may process one or more task requests received from the application program 147 based on a priority. For example, the middleware 143 may assign a priority for using the system resources (e.g., the bus 110, the processor 120, the memory 130, or the like) of the user terminal 100 to at least one of the application programs 147. For example, the middleware 143 may perform scheduling or load balancing on the one or more task requests by processing the one or more task requests based on the priority assigned to the at least one of the application programs 147.

The API 145 may be, for example, an interface through which the application program 147 controls a function provided by the kernel 141 or the middleware 143, and may include, for example, at least one interface or function (e.g., instruction) for file control, window control, image processing, character control, or the like.

The input/output interface 150 may serve as, for example, an interface capable of transmitting a command or data input from the user or another external device to other component(s) of the user terminal 100. In addition, the input/output interface 150 may output a command or data received from other component(s) of the user terminal 100 to the user or another external device.

The display 160 may include, for example, a liquid crystal display (LCD), a light emitting diode (LED) display, an organic light-emitting diode (OLED) display, a microelectromechanical systems (MEMS) display, or an electronic paper display. The display 160 may display, for example, various content (e.g., a text, an image, a videos, an icon, a symbol, or the like) to the user. The display 160 may include a touch screen, and may receive, for example, a touch, gesture, proximity, or hovering input using an electronic pen or a user's body part.

The communication interface 170 may establish, for example, communication between the user terminal 100 and an external device (e.g., the web server 200). For example, the communication interface 170 may be connected to a network via wireless communication or wired communication to be in communication with the external device (e.g., the web server 200).

The wireless communication may use, for example, at least one of long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), and the like as a cellular communication protocol. In addition, the wireless communication may include, for example, short-range communication. The short-range communication may include, for example, at least one of wireless fidelity (WiFi), Bluetooth, near field communication (NFC), global navigation satellite system (GNSS), and the like. The GNSS may include, for example, at least one of global positioning system (GPS), global navigation satellite system (Glonass), Beidou navigation satellite system (hereinafter, referred to as "Beidou"), a Galileo, and European global satellite-based navigation system, depending on a use area, a bandwidth, or the like. Hereinafter, in the present document, the "GPS" may be interchangeably used with the "GNSS". The wired communication may include, for example, at least one of universal serial bus (USB), high definition multimedia interface (HDMI), recommended standard 232 (RS-232), and plain old telephone service (POTS). The network may include a telecommunications network, for example, at least one of a computer network (e.g., LAN or WAN), the Internet, and a telephone network.

Figure 3:
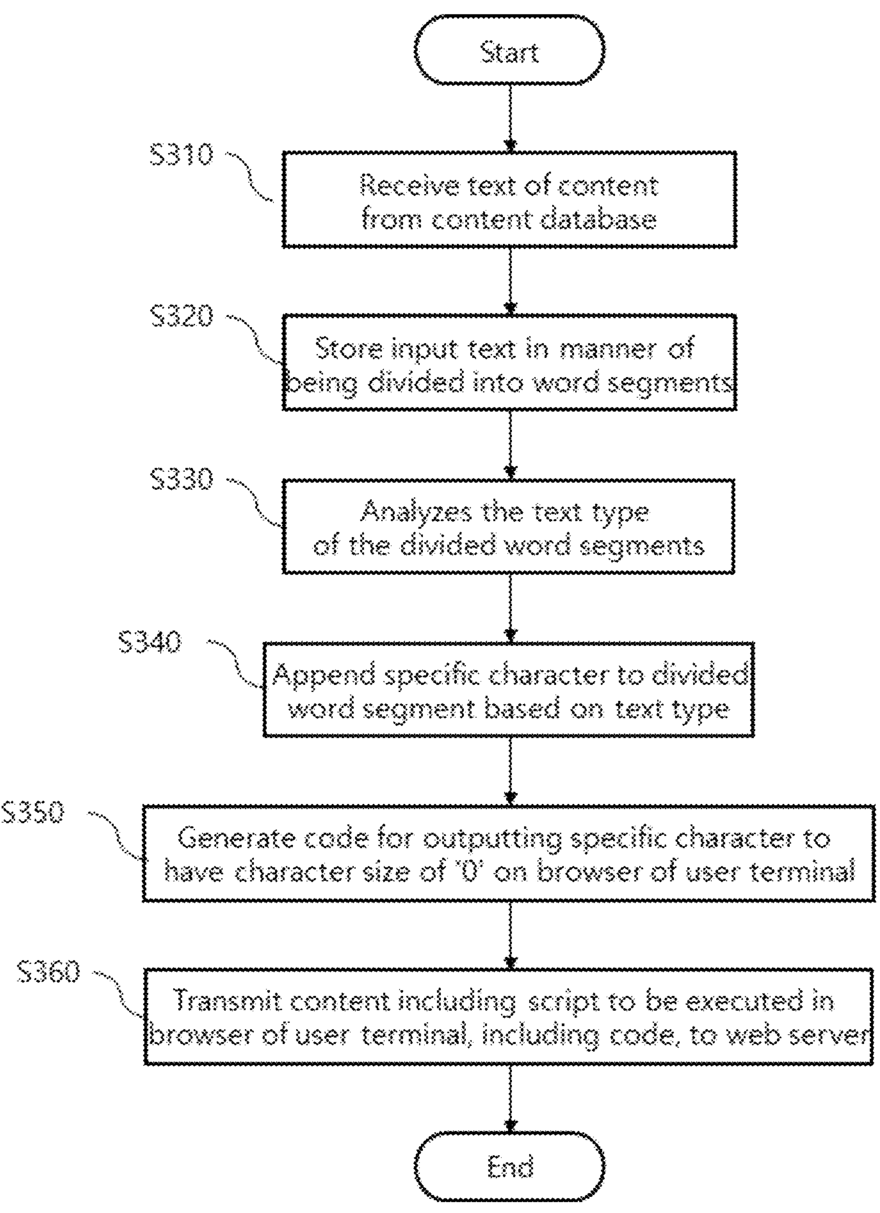
FIG. 3 is a flowchart illustrating a content unauthorized copying disabling method according to an embodiment of the present disclosure.

FIG. 3 is a flowchart illustrating a content unauthorized copying disabling method according to an embodiment of the present disclosure.

Referring to FIG. 3, the PHP server 300 receives the text of the content to be executed in the browser of the user terminal 100 from the content database 400 (S310). For example, the PHP server 300 may receive 'donghaemulgwa baekdusan' from the content database 400.

The PHP server 300 stores the input text in a manner of being divided into word segments (S320). For example, the PHP server 300 may divide 'donghaemulgwa baekdusan' into 'donghaemulgwa' and 'baekdusan'. Herein, a concept of 'storage' may mean temporarily storing the divided word segments in the RAM by assigning them to variables. In addition, the concept of "storage" includes any concept of storing the divided word segments in a storage medium other than the RAM, such as a separate storage device (an HDD or a DB).

The PHP server 300 analyzes the text type of the divided word segments (S330). For example, the PHP server 300 may identify that the divided word segments are in Korean based on the 'donghaemulgwa' and the 'baekdusan'.

The PHP server 300 appends the specific character (e.g., the prefix, the suffix, the random word, and the like) to the divided word segment based on the text type (S340). For example, the PHP server 300 may generate 'donghaemulgwaneun' and 'baekdusanyi' by appending "neun" to 'donghaemulgwa' and "yi" to 'baekdusan'. As another example, the prefix "cham-" may be appended to the 'baekdusan' like 'chambaekdusan'.

The PHP server 300 generates the code for outputting the specific character to have the character size of '0' on the browser of the user terminal 100 (S350). For example, the PHP server 300 may generate codes such as 'donghaemulgwa<span style='font-size:0px;'>neun</span>', 'baekdusan<span style='font-size:0px;'>yi</span>'. The codes are based on an html language form. An operation of the present disclosure may not be necessarily limited to the codes, and codes suitable for various web browsers, viewers, or the like operating in the user terminal 100 may be generated. It goes without saying that the above codes make the displayed size of the arbitrary inserted text to be output on the web browser, the viewer, or the like of the user terminal 100 '0'. The viewer includes all software capable of outputting all texts by adjusting sizes thereof, such as office programs such as Microsoft's Word, Excel, and PowerPoint, or Adobe's pdf viewer. That is, the present disclosure may be applied to all software capable of outputting text to which a formatting such as character size adjustment is applied.

The PHP server 300 transmits the content including the script to be executed in the browser of the user terminal 100, including the code, to the web server 200 (S360).

The method described above may be implemented via various means. For example, embodiments of the present disclosure may be implemented by hardware, firmware, software, or a combination thereof.

In the case of implementation by the hardware, the method according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of implementation by the firmware or the software, the method according to the embodiments of the present disclosure may be implemented in a form of a module, a procedure, a function, or the like that performs the functions or the operations described above. Software code may be stored in a memory unit and operated by a processor. The memory unit may be located inside or outside the processor and exchange data with the processor by various known means.

FIGS. 4 and 5 are diagrams illustrating an application example of a content unauthorized copying disabling method according to the present disclosure.

Specifically, FIG. 4 is an example in which data to which the content unauthorized copying disabling method according to the present disclosure is applied is output on the web browser, the pdf viewer, or the like. FIG. 5 is a diagram illustrating data viewed when copying the data output on the web browser, the pdf viewer, or the like without permission and pasting the data into a notepad, a word processor, and the like. The concept of copying the data without permission is the same as a concept of selectively copying the data such as text with 'ctrl+c' in a Windows program or the like and pasting the copied data with 'ctrl+v'. In one example, the present disclosure may disable unauthorized copying of data on other operating systems in addition to the Windows programs.

Referring to FIG. 4, when a student 1 is 'Hong Gil-dong', it appears as 'Hong Gil-dong' on the user terminal 100, but actual text is 'Hong Gil-dongyi'. That is, the code for outputting the character to have the character size of '0' is applied to the characters 'yi', and thus, the student 1 appears as 'Hong Gil-dong' on the user terminal 100. As such, there is no inconvenience for the user to inquire information, but when the information is copied without permission, it is impossible to reconstruct original text because the characters 'yi' are copied together as anti-copy text.

In addition, referring to FIG. 4, a Korean language score of the student 1 is output and viewed as '96.6'. '3', which is not visible in '96.6' by applying the present disclosure, is not visible to a naked eye of an actual person because it is output via the web browser or the viewer with the character size set to '0'. However, when '96.6' output on the web browser or the viewer is selected and copied without permission and then pasted to the notepad or the like, because the copied data includes the arbitrary number "3" or the like for disabling the unauthorized copying as shown in FIG. 5, '96.36' is pasted and appears. That's why the user is not able to take over '96.6', which is the actual perfect data. The present example is limited to the numbers and Korean, but does not need to be limited to Korean. Further, the present disclosure may also be applied to content in English, Chinese, Japanese, and the like.

In addition, according to the present disclosure, when a prefix, a suffix, a random character, or the like that is randomly selected at a specific time is inserted into specific content, and the content is copied without permission and distributed, the user may track when and from which client the called content was copied without permission via matching between the specific content and the inserted random character. Accordingly, a subject who copies the content without permission may be identified.

In addition, according to the present disclosure, the prefix, the suffix, and the random character may be generated and inserted whenever the client calls the content.

The embodiments disclosed in the present document have been described above with reference to the accompanying drawings. It should be understood that the embodiments shown in the drawings should not to be interpreted in a limiting sense, but may be combined with each other by those skilled in the art who are familiar with the contents of the present document, and in the case of such combination, it may be interpreted that some components may be omitted.

Here, the terms or the words used in the present document and the claims should not be construed as being limited to ordinary or dictionary meanings, but should be construed as meanings and concepts consistent with the technical spirit disclosed herein.

Therefore, the embodiments described herein and the configurations shown in the drawings are only the embodiments disclosed herein, and do not represent all the technical ideas disclosed herein, so that it should be understood that there may be various equivalents and modifications that may replace them at the time of the present application.

INDUSTRIAL APPLICABILITY

The present invention can be used in all industries involving online, internet, etc. The present invention can also be used in industries for protecting rights for copyright materials.

The invention claimed is:

1. An unauthorized copying content disabling device for outputting content composed of text through a web browser, the unauthorized copying content disabling device comprising:

a memory configured to store divided word segments for each text of the content;

one or more processors connected to the memory, wherein the one or more processors are configured to:

divide received text into word segments and store the word segments in the memory; and append a specific character to each divided word segment, by the unauthorized copying content disabling device;

a dictionary database storing various language information required for the one or more processors to analyze languages and numbers; and a content database storing prefixes, suffixes, and random words for each language, wherein the content constitutes data visible to a naked eye in a web document on the user terminal, wherein the one or more processors are configured to:

generate a code for outputting the specific character to have the character size of '0' on a browser of the user terminal;

transmit, to a web server, the program written in the program language including the code and to be executed on the user terminal, wherein the web server is configured to transmit the program written in the program language displayed on the browser to the user terminal;

analyze a text type of the each divided word segment using the dictionary database; and append the specific character to the each divided word segment based on the text type, wherein the specific character includes at least one of the prefixes, the suffixes, and the random words stored in the content database, wherein the specific character having the character size of '0' acts as anti-copy text that is not visible to a naked eye on the browser, wherein when content output on the browser of the user terminal is selectively copied and pasted, the specific character having the character size of '0' is copied together with the divided word segments as the anti-copy text such that original text of the content is unable to be reconstructed, thereby disabling the unauthorized copying of the content, and wherein the content is an electronic document in a format selected from at least one of Excel, Word, PowerPoint, portable document format (PDF), and Hangul.

2. An unauthorized content copying neutralization device for outputting content composed of text through a web browser, the unauthorized content copying neutralization device comprising:

a memory configured to store divided word segments for each text of the content;

one or more processors connected to the memory, wherein the one or more processors are configured to:

divide received text into word segments and store the word segments in the memory; and append a specific character to each divided word segment, by the unauthorized content copying neutralization device;

a dictionary database storing various language information required for the one or more processors to analyze languages and numbers; and a content database storing prefixes, suffixes, and random words for each language, wherein the content constitutes data visible to a naked eye in a web document on the user terminal, wherein the one or more processors are configured to:

generate a code for outputting the specific character to have the character size of '0' on a browser of the user terminal;

transmit, to a web server, the program written in the program language including the code and to be executed on the user terminal, wherein the web server is configured to transmit the program written in the program language displayed on the browser to the user terminal;

analyze a text type of the each divided word segment using the dictionary database; and append the specific character to the each divided word segment based on the text type, wherein the specific character includes at least one of the prefixes, the suffixes, and the random words stored in the content database, wherein the specific character having the character size of '0' acts as anti-copy text that is not visible to a naked eye on the browser, wherein when content output on the browser of the user terminal is selectively copied and pasted, the specific character having the character size of '0' is copied together with the divided word segments as the anti-copy text such that original text of the content is unable to be reconstructed, thereby neutralizing the unauthorized copying of the content, and wherein the content is an electronic document in a format selected from at least one of Excel, Word, PowerPoint, portable document format (PDF), and Hangul.

3. A method for disabling unauthorized copying of content using an unauthorized copying content disabling device for outputting content composed of text through a web browser, the unauthorized copying content disabling device comprising:

a memory configured to store divided word segments for each text of the content;

one or more processors connected to the memory;

a dictionary database storing various language information required for the one or more processors to analyze languages and numbers; and a content database storing prefixes, suffixes, and random words for each language, wherein the content constitutes data visible to a naked eye in a web document on a user terminal; and the method comprising:

dividing, by one or more processors, received text of the content into word segments and storing the word segments in the memory;

appending, by the one or more processors, a specific character to each divided word segment;

generating, by the one or more processors, a code for outputting the specific character to have a character size of '0' on a browser of the user terminal;

transmitting, by the one or more processors to a web server, the program written in the program language including the code and to be executed on the user terminal, wherein the web server is configured to transmit the program written in the program language displayed on the browser to the user terminal, analyzing a text type of the each divided word segment using the dictionary database; and appending the specific character to the each divided word segment based on the text type, wherein the specific character includes at least one of the prefixes, the suffixes, and the random words stored in the content database, wherein the specific character having the character size of '0' acts as anti-copy text that is not visible to a naked eye on the browser, wherein when content output on the browser of the user terminal is selectively copied and pasted, the specific character having the character size of '0' is copied together with the divided word segments as the anti-copy text such that original text of the content is unable to be reconstructed, thereby disabling the unauthorized copying of the content, and wherein the content is an electronic document in a format selected from at least one of Excel, Word, PowerPoint, portable document format (PDF), and Hangul.

* * * * *